(12) United States Patent
Manning et al.

(10) Patent No.: US 10,611,503 B2
(45) Date of Patent: Apr. 7, 2020

(54) CENTER OF MASS CONTROL OF LIQUID TANKS FOR SPACECRAFT USE

(71) Applicant: KEYSTONE ENGINEERING COMPANY, Long Beach, CA (US)

(72) Inventors: Robert Manning, Lebanon, IN (US); Ian Ballinger, Anaheim Hills, CA (US); Wayne H. Tuttle, Torrance, CA (US)

(73) Assignee: Keystone Engineering Company, Long Beach, CA (US)

( * ) Notice: Subject to any disclaimer, the term of this patent is extended or adjusted under 35 U.S.C. 154(b) by 71 days.

(21) Appl. No.: 15/562,390

(22) PCT Filed: Apr. 22, 2016

(86) PCT No.: PCT/US2016/028769
§ 371 (c)(1),
(2) Date: Sep. 27, 2017

(87) PCT Pub. No.: WO2016/172430
PCT Pub. Date: Oct. 27, 2016

(65) Prior Publication Data
US 2018/0281992 A1    Oct. 4, 2018

Related U.S. Application Data

(60) Provisional application No. 62/151,345, filed on Apr. 22, 2015.

(51) Int. Cl.
*B64G 1/40* (2006.01)
*F17C 13/00* (2006.01)

(52) U.S. Cl.
CPC ............ *B64G 1/402* (2013.01); *F17C 13/008* (2013.01); *F17C 2201/0109* (2013.01);
(Continued)

(58) Field of Classification Search
CPC .................. B64G 1/402; F17C 13/008; F17C 2201/0109; F17C 2201/0166;
(Continued)

(56) References Cited

U.S. PATENT DOCUMENTS 4,272,257 A * 6/1981 Ellion ................ B01D 19/0031
210/488
4,553,565 A * 11/1985 Kerebel ................ B64G 1/402
137/590

(Continued)

FOREIGN PATENT DOCUMENTS

JP    2010-132188 A    6/2010
KR    10-0387710 B1    6/2003

OTHER PUBLICATIONS

International Preliminary Report on Patentability & Written Opinion of the International Search Authority, for PCT Patent Application No. PCT/US2016/028769, dated Oct. 24, 2017, 9 pages.

(Continued)

*Primary Examiner* — Ernesto A Grano
(74) *Attorney, Agent, or Firm* — Kinney & Lange, P.A.

(57) ABSTRACT

A rigid structure propellant management device (PMD) liquid storage tank includes an outer shell and internal structures inside the outer shell that include a plurality of vertical columns each made up of a stack of individual storage cells. Each of the storage cells has solid vertical sidewalls and top and bottom capillary windows that allow vertical liquid transfer between adjacent cells in a vertical column. The top and bottom capillary windows in each of the storage cells have permeabilities that result in a selected direction of liquid flow in each column. A piping and valve system may be connected to the top capillary window of a top storage cell and to the bottom capillary window of a bottom storage cell of each vertical column, configured to allow controlled liquid transfer between adjacent vertical (Continued)

columns so that locations of empty cells in the tank as liquid is drawn from the tank achieves a selected column by column drainage sequence and controls a center of mass of the tank.

14 Claims, 6 Drawing Sheets

(52) U.S. Cl.
CPC .............. *F17C 2201/0166* (2013.01); *F17C 2201/0171* (2013.01); *F17C 2201/054* (2013.01); *F17C 2201/056* (2013.01); *F17C 2201/06* (2013.01); *F17C 2205/0397* (2013.01); *F17C 2270/0194* (2013.01)

(58) Field of Classification Search
CPC ........ F17C 2201/0171; F17C 2201/056; F17C 2201/054; F17C 2201/06; F17C 2205/0397; F17C 2270/0194; F17C 2223/035; F17C 2223/036; F17C 2223/0123; F17C 2223/012; F17C 2201/2201
USPC .................................... 206/0.6, 0.7; 220/564
See application file for complete search history.

(56) References Cited

U.S. PATENT DOCUMENTS

| | | | | |
|---|---|---|---|---|
| 4,976,398 A * | 12/1990 | Bruhn | ................... | B64G 1/402 137/38 |
| 5,209,115 A * | 5/1993 | Bond | ................... | B64G 1/402 219/438 |
| 5,279,323 A * | 1/1994 | Grove | ................... | F17C 9/00 137/154 |
| 5,901,557 A * | 5/1999 | Grayson | ................... | F17C 1/00 62/45.1 |
| 6,627,229 B2 * | 9/2003 | Kikuchi | ................ | A61K 33/06 424/405 |
| 6,638,348 B2 * | 10/2003 | Kuriiwa | ................ | B01D 53/02 206/0.7 |
| 7,323,043 B2 * | 1/2008 | Finamore | ................... | C10J 3/78 206/0.7 |
| 7,404,842 B1 * | 7/2008 | Wainright | ................. | B22F 9/04 75/351 |
| 7,563,305 B2 * | 7/2009 | Zimmermann | ....... | C01B 3/0078 206/0.7 |
| 7,708,815 B2 * | 5/2010 | Zimmermann | ......... | C01B 3/001 206/0.7 |
| 9,970,389 B2 * | 5/2018 | Lopez | ................... | B64G 1/402 |
| 10,065,751 B2 * | 9/2018 | Kawahara | ............. | B64G 1/402 |
| 2003/0209147 A1 * | 11/2003 | Myasnikov | ........ | B01D 53/0415 96/146 |
| 2005/0188847 A1 * | 9/2005 | Fujita | .................... | F17C 11/005 96/126 |
| 2006/0086125 A1 * | 4/2006 | Sueoka | ............. | B01D 53/0438 62/304 |
| 2006/0145022 A1 * | 7/2006 | Buehler | ................ | B64G 1/402 244/172.2 |
| 2011/0226781 A1 * | 9/2011 | Walser | ...................... | F17C 1/02 220/581 |
| 2011/0315690 A1 | 12/2011 | Weisberg | | |
| 2013/0008185 A1 | 1/2013 | Newman et al. | | |
| 2014/0191499 A1 * | 7/2014 | Campbell | ............ | B60P 3/2205 280/837 |
| 2014/0345464 A1 | 11/2014 | Behruzi et al. | | |
| 2016/0311559 A1 * | 10/2016 | Hu | ........................ | F17C 13/008 |
| 2018/0229863 A1 * | 8/2018 | Veto | ......................... | F17C 1/08 |

OTHER PUBLICATIONS

International Search Report dated Aug. 9, 2016, for corresponding PCT Application No. PCT/US2016/028769.

* cited by examiner

CENTER OF MASS CONTROL OF LIQUID TANKS FOR SPACECRAFT USE

CROSS-REFERENCE TO RELATED APPLICATION(S)

This application claims the benefit of U.S. Provisional Application No. 62/151,345 filed Apr. 22, 2015 for "Method of Center of Mass Control of Liquid Tanks for Spacecraft Use" by R. Manning, I. Ballinger and W. Tuttle.

BACKGROUND

In a microgravity environment, gravity no longer dictates the location of a liquid within a tank. Surface tension, vehicle rotations, and accelerations can cause movements of the liquid within the tank. These movements can position a liquid away from the outlet and cause gas to be ingested into the outlet manifold, which is undesirable. Furthermore, the vehicle center of mass can be shifted significantly by the liquid and create difficultly in maintaining the rotational attitude of the vehicle. Propellant management devices (PMD) are structures located within the tank which reduce liquid movements or reposition the liquid to ensure gas-free delivery. Two categories of PMDs exist: positive-expulsion devices and rigid-structure PMDs.

Positive-expulsion devices consist of a rigid tank with an interior flexible membrane. The membrane partitions the liquid from the ullage gas. The membrane collapses towards the outlet as liquid is removed from the tank. Two types of these membranes are bladders, which are composed of a flexible plastic or fabric, or a diaphragm, which is a thin flexible disk. Both types of membranes ensure gas-free delivery and quickly damp movement of the liquid. However, many bladder and diaphragm materials have poor compatibility with many propellants and oxidizers used in spacecraft. Furthermore, experimental verification of these devices is necessary since analysis is currently unable to assess performance.

Rigid-structure PMDs consist of rigid metallic structures that wick and store a small amount of liquid. Devices of this type that are in use are numerous: simple vanes, ribbon vanes, gallery arms, sponges (refillable traps), and sumps. These devices are mechanically simple with no moving parts. They may be machined from almost any metal or plastic, so material compatibility is typically not a limitation. These devices may be analyzed using analytic techniques or computational fluid dynamics. However, since only a small amount of the liquid is actively controlled, the position of the center of mass may move significantly and rapidly after an acceleration.

SUMMARY

A rigid structure propellant management device (PMD) liquid storage tank includes an outer shell and internal structures inside the outer shell that include a plurality of vertical columns each made up of a stack of individual storage cells. Each of the storage cells has solid vertical sidewalls and top and bottom capillary windows that allow vertical liquid transfer between adjacent cells in a vertical column. The top and bottom capillary windows in each of the storage cells have permeabilities that result in a selected direction of liquid flow in each column. In some embodiments, a piping and valve system may be connected to the top capillary window of a top storage cell and to the bottom capillary window of a bottom storage cell of each vertical column, configured to allow controlled liquid transfer between adjacent vertical columns so that locations of empty cells in the tank as liquid is drawn from the tank achieves a selected column by column drainage sequence and controls a center of mass of the tank.

A method of producing a rigid structure propellant management device (PMD) liquid storage tank for storing liquid in a microgravity environment may include forming the tank with an outer shell and internal structures inside the outer shell that include a plurality of vertical columns of storage cells, where each of the storage cells have vertical sidewalls and top and bottom capillary windows that allow vertical liquid transfer between adjacent cells in each of the vertical columns. The top and bottom capillary windows in each of the storage cells may be formed with permeabilities that result in a selected direction of liquid flow through the storage cells in each of the vertical columns. In some embodiments, a piping and valve system may be connected to the top capillary window of a top storage cell and to the bottom capillary window of a bottom storage cell of each vertical column, to allow controlled liquid transfer between adjacent vertical columns. configuring the piping and valve system, and the top capillary window of the top storage cell and the bottom capillary window of the bottom storage cell of each vertical column, to control locations of empty cells in the tank as liquid is drawn from the tank to achieve a selected column by column drainage sequence and control a center of mass of the tank.

DETAILED DESCRIPTION

Figure 1A:
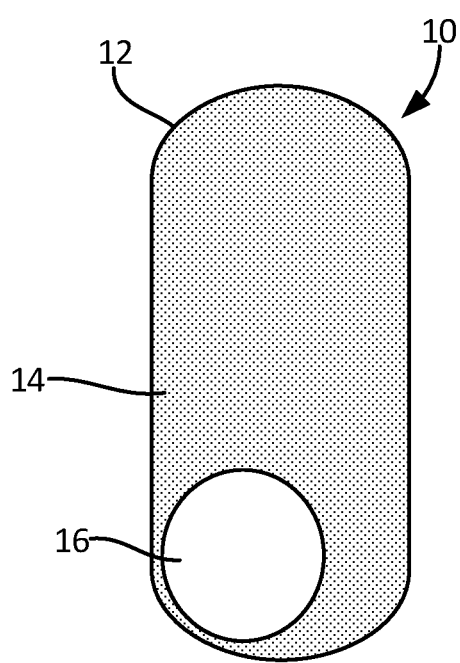
FIG. 1A is a schematic illustration of a rigid structure PMD with a ullage bubble.
Figure 1B:
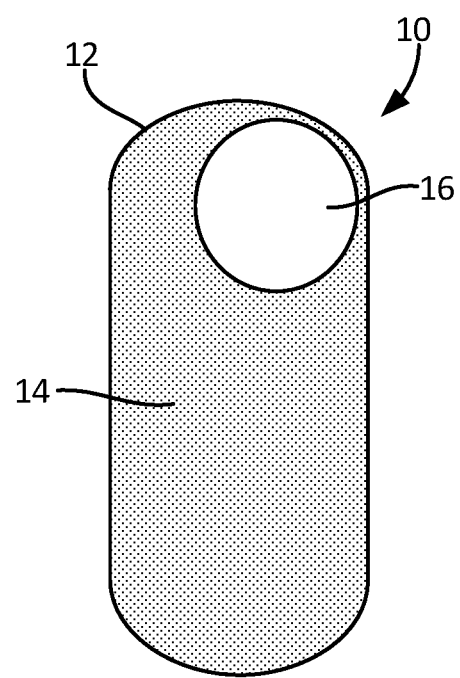
FIG. 1B is a schematic illustration of the PMD of FIG. 1A after an acceleration.
Figure 2A:
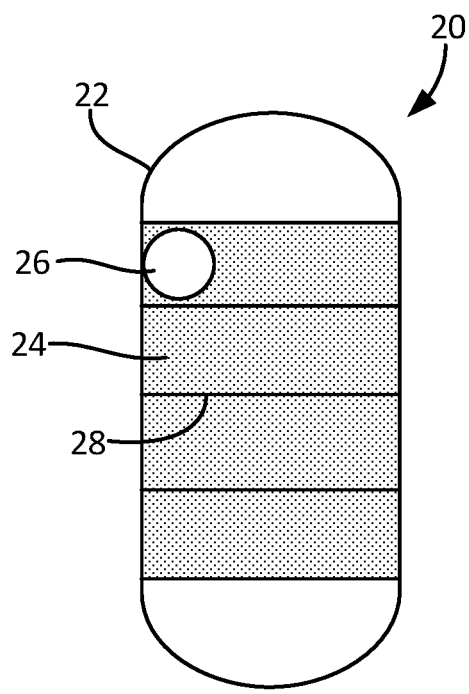
FIG. 2A is a schematic illustration of a rigid structure PMD with internal subdivisions and a ullage bubble.
Figure 2B:
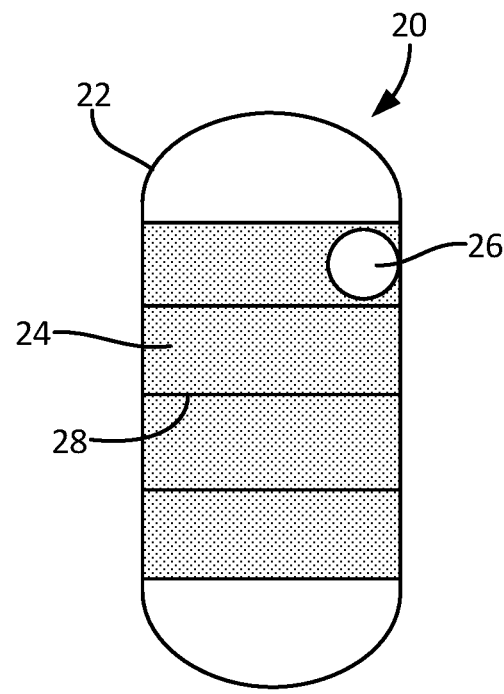
FIG. 2B is a schematic illustration of the PMD of FIG. 2A after an acceleration.

FIG. 1A illustrates the movement of liquid within a traditional rigid structure PMD 10. PMD 10 comprises tank wall 12, liquid propellant 14, and ullage gas bubble 16. For example, ullage bubble 16 may be located towards the bottom of the tank when in microgravity. If the tank is accelerated toward the upper right, the ullage bubble drifts to the right and top causing a significant shift in the center of mass as shown in FIG. 1B. However, if the tank is subdivided as shown in FIG. 2A into cells divided by barriers 28, the center of mass moves significantly less as shown in FIG. 2B.

Figure 3:
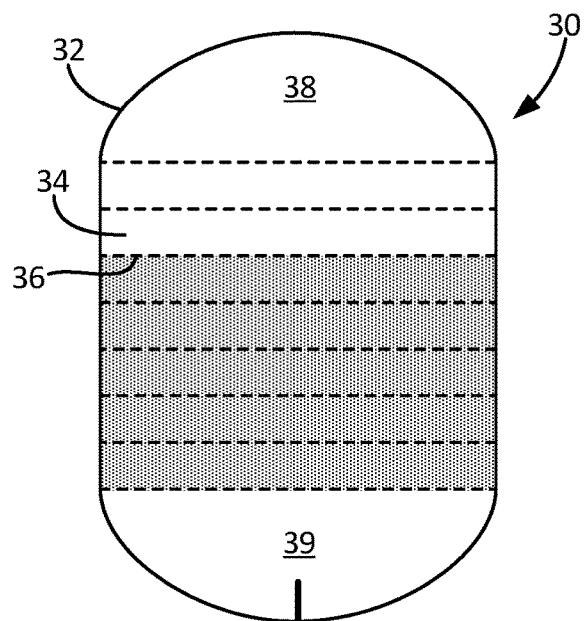
FIG. 3 is a schematic illustration of a rigid structure PMD with internal compartments separated by capillary windows.

As shown above, a rigid structure PMD may be capable of restricting the center of mass movement. In principle, if small cells containing liquid are drained sequentially such that only one cell or a limited number of cells are partially filled and the rest are nearly filled or empty, only a small amount of liquid may move thereby restricting the center of mass movement. One concept PMD comprises an outer tank with internal cells that restrict the center of mass movement (CoM cells) that contain the remaining liquid and appropriate support structures for the CoM cells. This concept is illustrated by PMD structure 30 in FIG. 3. PMD structure 30 comprises outer tank shell 32, CoM cells 34, capillary windows 36, and storage compartments 38 and 39 above and below the capillary windows. Storage compartments 38 may be a region where ullage gas to pressure the tank may be stored. Storage compartment 39 may contain traditional PMD structures to collect propellant or move propellant to a tank outlet.

Capillary windows 36 may consist of tightly woven screens or small holes that are capillary wetted by liquid. These structures may significantly reduce gas from entering adjacent full compartments or liquid from entering prior adjacent dry compartments.

Figure 4:
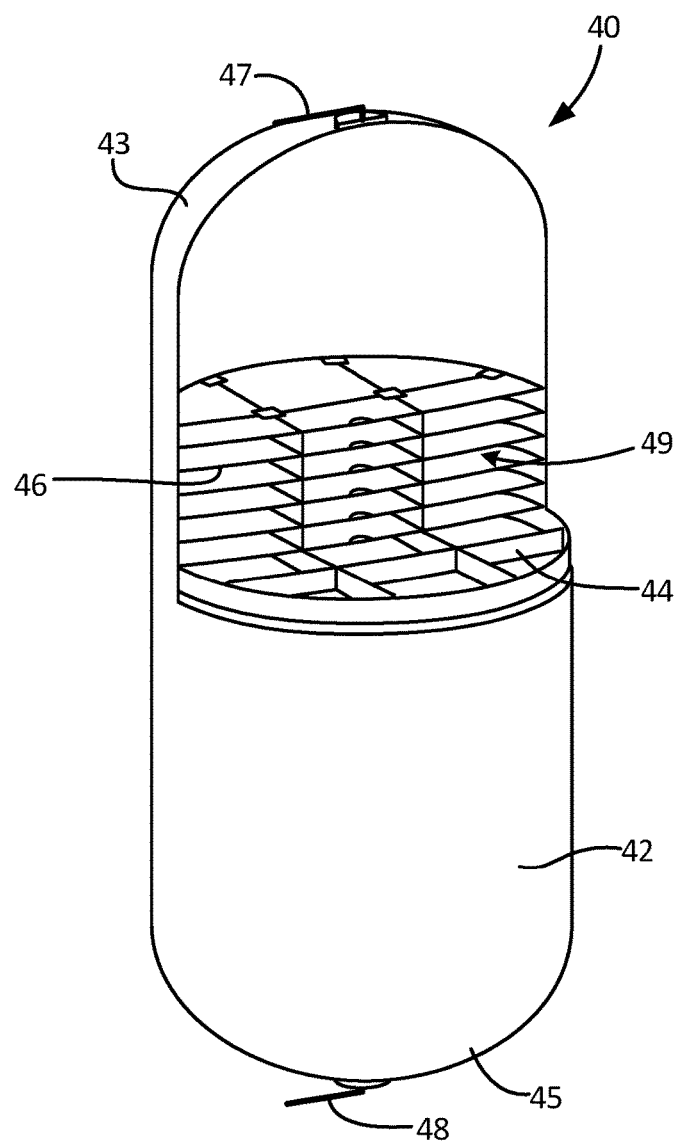
FIG. 4 is a cut away view of a rigid structure PMD with internal compartments, capillary windows, and baffles.

An improved system and method of controlling and restricting the center of mass movement using a rigid structure PMD, wherein each single CoM cell has internal structures in addition to the capillary windows on the bottom and top of the cells, is described in detail below. FIG. 4 shows a cut away view of rigid PMD structure 40, which is configured such that each single CoM cell has internal structures in addition to the capillary windows on the bottom and top of the cells. Rigid PMD structure 40 comprises tank shell 42, upper dome 43, vertical cell walls 44, lower dome 45, capillary window 46, upper tank connection 47, and lower tank connection 48. The vertical cell walls (or baffles) 44 segment the liquid into different cells 49. This further reduces the lateral center of mass movement by reducing the distance and rate the fluid can travel within the storage tank. In various embodiments, the baffles may or may not permit fluid communication between cells as required based on anticipated acceleration in the mission profile. This fluid movement does not significantly affect the performance of this concept because an entire cell is drained via the capillary windows to the next cell. The baffles may be arranged in a variety of ways in any compartmental shape.

Figure 5:
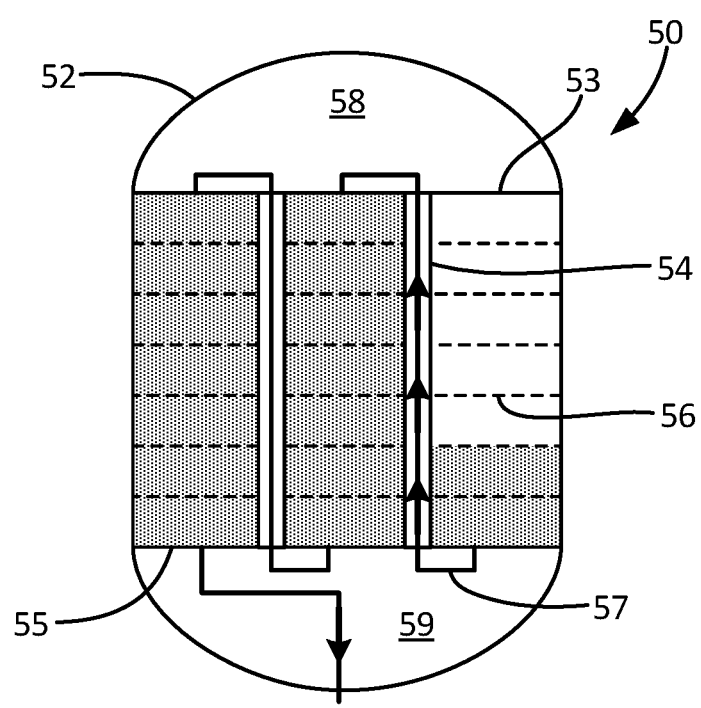
FIG. 5 is a schematic illustration of a rigid structure PMD with interconnected vertically stacked internal compartments.

In another embodiment, as illustrated in FIG. 5, multiple vertical columns of CoM cells may be arranged to manage the center of mass control. FIG. 5 shows a schematic illustration of rigid structure PMD 50 with interconnected vertical columns comprising tank shell 52, top barrier 53, vertical baffle 54, bottom barrier 55, capillary window 56, piping 57, upper storage chamber 58, and lower storage chamber 59. In embodiments using multiple columns, such as shown in FIG. 5, each column of CoM cells is similar to the single column concept described above. Each cell provides liquid from an upper cell to a lower cell using capillary windows. At the bottom of a column, liquid is scavenged and piped to the next column. The pipe may lead to the bottom or top of the next column (the use of the terms such as "pipe", "top", "bottom", "upper", and "lower" are to assist the reader in visualizing flow based on the sketches.) The actual communication device and direction of flow within each column is based on the design and placement of wicking and storage structures and not related to orientation to Earth or other gravitational forces. The columns may be parallel as shown or mutually perpendicular along all three Cartesian coordinates or in other configurations. The last CoM cell may feed directly into the tank outlet, as shown in FIG. 5 or empty into storage chamber 59 below the CoM cells. In the latter, a traditional PMD is used to collect the liquid to supply the tank outlet. These multiple columns of CoM cells are typically supported by two or more bulkheads that are attached to the shell of the tank.

Figure 6A:
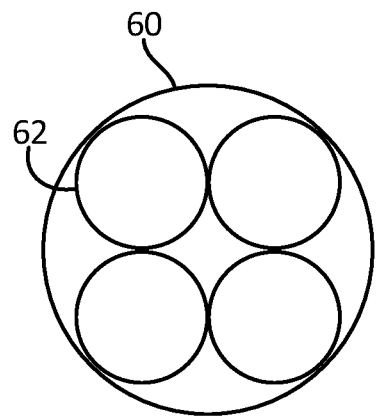
FIG. 6 is a schematic cross-section of a rigid structure PMD with individual storage columns with different shapes.
Figure 6B:
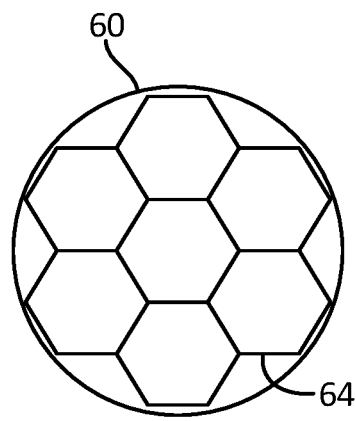
Figure 6C:
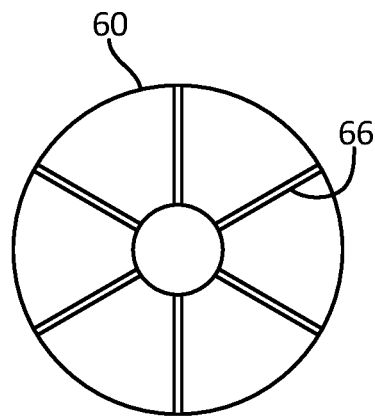

Columns of CoM cells can have various shapes and can be arranged different ways. FIGS. 6A, 6B, and 6C show three possible arrangements, but other arrangements and shapes are possible. For example, the individual compartments may be comprised of circular (FIG. 6A), hexagonal (FIG. 6B), truncated circular sectors (FIG. 6C) or other cross-sectional shapes. Individual columns may have separate walls (as shown in the walls 62 of circular columns in FIG. 6A) or share a common wall (as illustrated in the walls 64 of hexagonal columns in FIG. 6B, and in the walls 66 of truncated circular sectors in FIG. 6C). The regions within the tank void of the CoM cells are used to route piping and provide a region for pressurent gas. By arranging the cells and their draining sequence the center of mass for the tank and its contents may be optimized. For example, in the sequencing arrangement depicted in FIG. 5, transient lateral shifts in center of mass are substantially controlled during position and orientation maneuvers of the spacecraft, but the center of mass of the tank and its contents shift as fuel is removed from the tank.

Figure 7:
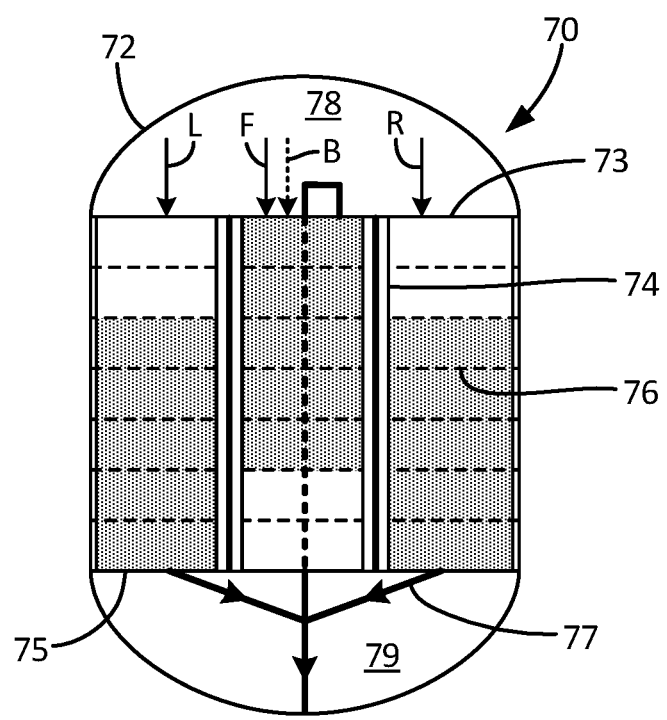
FIG. 7 is a schematic illustration of a rigid structure PMD with vertically stacked internal compartments with a controlled center of mass.

FIG. 7 is a schematic illustration of rigid PMD structure 70 configured so that the flow arrangement can be controlled to maintain the center of mass constant as fuel is consumed. As shown in FIG. 7, rigid PMD structure 70 has four vertical columns wherein the fourth column is behind the center column in the figure. Rigid PMD structure 70 has four interconnected vertical columns comprising tank shell 72, top barrier 73, vertical baffles 74, bottom barrier 75, capillary windows 76, piping 77, upper storage chamber 78, and lower storage chamber 79. A left vertical column is indicated by arrow L. A right vertical column is indicated by arrow R. A front vertical column is indicated arrow F and a back vertical column that is not visible in the figure is indicated by dotted arrow B. The bubble point gradients in each column are set such that the top CoM cells of the right and left columns empty from the top down and the front and back center columns empty from the bottom up thereby leaving the center of mass unchanged. Bubble point is defined as the pressure required to blow the first continuous bubbles detectable through a sample.

Figure 8:
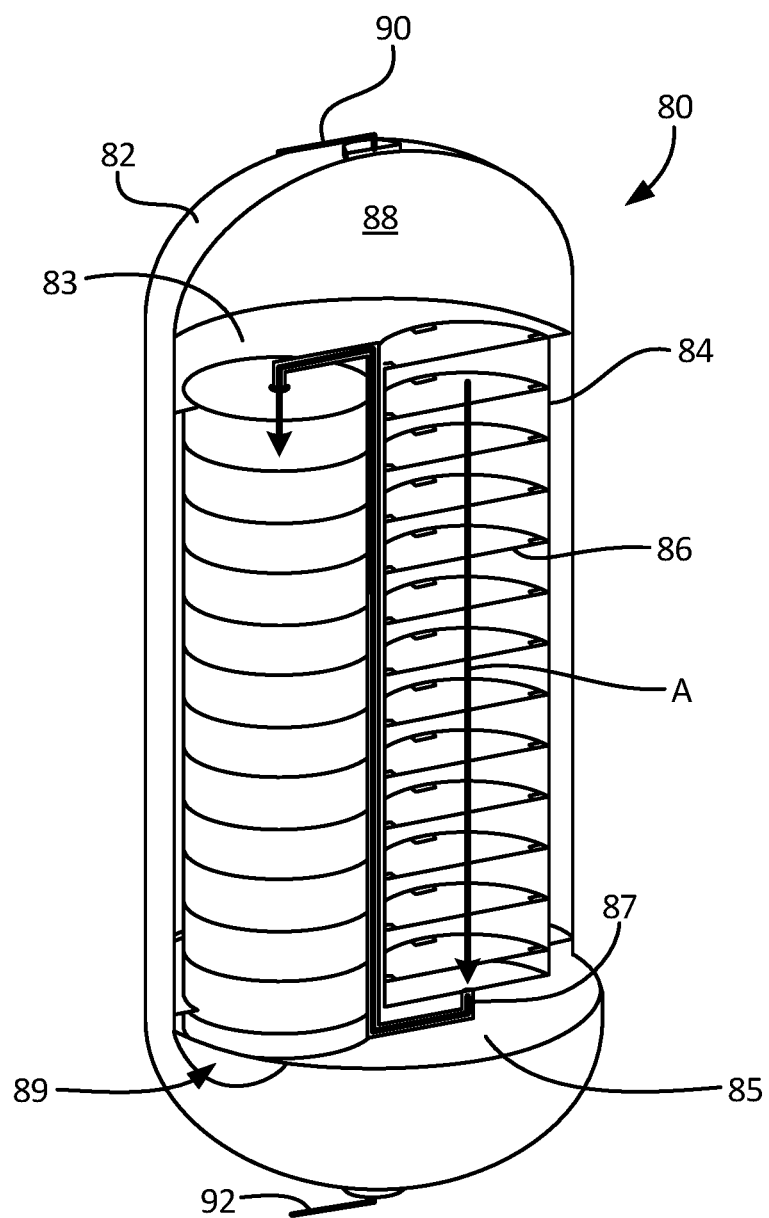
FIG. 8 is a cut away view of a rigid structure PMD with multiple storage compartments, capillary windows, and inter-column fluid control.

FIG. 8 is a cut away view of rigid PMD structure 80 with multiple vertical columns of CoM storage cells. PMD structure 80 comprises tank shell 82, top barrier 83, vertical barrier 84, bottom barrier 85, capillary window 86, piping 87, upper storage chamber 88, lower storage chamber 89, upper tank connection 90 and lower tank connection 92. Capillary windows 86 that comprise the entry and exit points for each CoM cell use screens (woven screens or plates with a field of small holes) to readily pass fluid between compartments, but will block gas flow until the differential pressure across the screen exceeds the "bubble point" of the screen. In the vertical columns of the invention, capillary windows with varying bubble points can pass fluid through a column from one level in the column at a time. This will enable the propellant tank to substantially maintain its center of mass as fuel is consumed during a mission. In FIG. 8 the direction of fluid flow is indicated by arrow A.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A rigid structure propellant management device (PMD) liquid storage tank comprising:
   an outer shell;
   internal structures inside the outer shell comprising a plurality of vertical columns each comprising a stack of individual storage cells, wherein each of the storage cells comprises solid vertical sidewalls and top and bottom capillary windows that allow vertical liquid transfer between adjacent cells in a vertical column, the top and bottom capillary windows in each of the storage cells having permeabilities that result in a selected direction of liquid flow in each column; and
   a piping and valve system connected to the top capillary window of a top storage cell and to the bottom capillary window of a bottom storage cell of each vertical column, the piping and valve system being configured to allow controlled liquid transfer between adjacent vertical columns;
   wherein the piping and valve system, and the top capillary window of the top storage cell and the bottom capillary window of the bottom storage cell of each vertical column, are configured and arranged to control locations of empty cells in the tank as liquid is drawn from the tank to achieve a selected column by column drainage sequence and to control a center of mass of the tank.

2. The rigid structure PMD liquid storage tank of claim 1, wherein the outer shell and internal structures are metal or plastic structures.

3. The rigid structure PMD liquid storage tank of claim 1, wherein the capillary windows comprise woven screens or holes that are capillary wetted by the liquid.

4. The rigid structure PMD liquid storage tank of claim 1, wherein the vertical columns of storage cells have separate walls.

5. The rigid structure PMD liquid storage tank of claim 1, wherein the vertical columns of storage cells share a common wall.

6. The rigid structure PMD liquid storage tank of claim 1, wherein the storage cells in each vertical column have cross-sectional shapes that are circular, hexagonal, or truncated circular sectors.

7. The rigid structure PMD liquid storage tank of claim 1, wherein the vertical columns of storage cells are supported by a plurality of bulkheads that are attached to the outer shell of the storage tank.

8. A method of producing a rigid structure propellant management device (PMD) liquid storage tank for storing liquid in a microgravity environment, the method comprising:
   forming the tank with an outer shell and internal structures inside the outer shell comprising a plurality of vertical columns of storage cells, each of the storage cells comprising vertical sidewalls and top and bottom capillary windows that allow vertical liquid transfer between adjacent cells in each of the vertical columns;
   forming the top and bottom capillary windows in each of the storage cells wit permeabilities that result in a selected direction of liquid flow through the storage cells in each of the vertical columns;
   providing a piping and valve system connected to the top capillary window of a top storage cell and to the bottom capillary window of a bottom storage cell of each vertical column, the piping and valve system being configured to allow controlled liquid transfer between adjacent vertical columns; and
   configuring the piping and valve system, and the top capillary window of the top storage cell and the bottom capillary window of the bottom storage cell of each vertical column, to control locations of empty cells in the tank as liquid is drawn from the tank to achieve a selected column by column drainage sequence and to control a center of mass of the tank.

9. The method of claim 8, wherein the outer shell and internal structures are metallic or plastic structures.

10. The method of claim 8, wherein the capillary windows comprise woven screens or holes that are capillary wetted by the liquid.

11. The method of claim 8, wherein the vertical columns of storage cells have separate walls.

12. The method of claim 8, wherein the vertical columns of storage cells share a common wall.

13. The method of claim 8, wherein the storage cells in each vertical column have cross- sectional shapes that are circular, hexagonal, or truncated circular sectors.

14. The method of claim 8, wherein the vertical columns of storage cells are supported by a plurality of bulkheads that are attached to the outer shell of the storage tank.

* * * * *